US012619949B2

(12) United States Patent (10) Patent No.: US 12,619,949 B2
Meersseman et al. (45) Date of Patent: May 5, 2026

(54) PRODUCT, PANEL AND METHOD FOR MANUFACTURING AND/OR AUTHENTICATING AND/OR TRACKING SUCH PRODUCT

(71) Applicant: FLOORING INDUSTRIES LIMITED, SARL, Bertrange (LU)

(72) Inventors: Laurent Meersseman, Wielsbeke (BE); Bart Van Der Stockt, Wielsbeke (BE); Benny Schacht, Wielsbeke (BE)

(73) Assignee: UNILIN, BV, Wielsbeke (BE)

( * ) Notice: Subject to any disclaimer, the term of this patent is extended or adjusted under 35 U.S.C. 154(b) by 331 days.

(21) Appl. No.: 18/193,869

(22) Filed: Mar. 31, 2023

(65) Prior Publication Data

US 2023/0385760 A1 Nov. 30, 2023

Related U.S. Application Data

(60) Provisional application No. 63/434,807, filed on Dec. 22, 2022.

(30) Foreign Application Priority Data

May 25, 2022 (EP) .................................... 22175460

(51) Int. Cl.
*G06Q 10/087* (2023.01)
*G06Q 30/018* (2023.01)

(52) U.S. Cl.
CPC ......... *G06Q 10/087* (2013.01); *G06Q 30/018* (2013.01)

(58) Field of Classification Search
CPC .............. G06Q 10/087; G06Q 30/018; G06Q 10/06395; G06Q 10/0833; E04F 13/0894; E04F 13/10; E04F 13/16; E04F 13/18; E04F 15/02038; E04F 15/102; E04F 15/105
See application file for complete search history.

(56) References Cited

U.S. PATENT DOCUMENTS

| 11,599,605 | B1 * | 3/2023 | Pierce ..................... G06F 21/16 |
| 12,073,487 | B2 * | 8/2024 | Kamath ................ G06T 1/0028 |

(Continued)

FOREIGN PATENT DOCUMENTS

| CN | 116198241 A | 6/2023 |
| WO | 0147724 A1 | 7/2001 |
| WO | 2013023844 A1 | 2/2013 |

(Continued)

OTHER PUBLICATIONS

International Search Report from corresponding PCT Application No. PCT/IB2023/054993, Aug. 14, 2023.

(Continued)

*Primary Examiner* — Garcia Ade
(74) *Attorney, Agent, or Firm* — Workman Nydegger

(57) ABSTRACT
A panel product and related systems and methods comprising a code directly or indirectly linked to data regarding one or more physical parameters and/or the manufacturing of said product or of the batch said product is taken from. The invention also relate to a system and method for manufacturing such panel products, as well as to a method for authenticating and/or tracking panel products with computer-traceable data linked to the code.

22 Claims, 5 Drawing Sheets

(56)     References Cited

U.S. PATENT DOCUMENTS

2022/0301094 A1     9/2022  Filler et al.
2022/0388213 A1 *  12/2022  Filler ................... B29C 45/372

FOREIGN PATENT DOCUMENTS

| WO | 2019052953 A1 | 3/2019 | |
| WO | WO-2019072733 A1 * | 4/2019 | ............. B41M 5/00 |
| WO | 2022003487 A1 | 1/2022 | |
| WO | 2022033464 A1 | 2/2022 | |
| WO | 2024017948 A1 | 1/2024 | |

OTHER PUBLICATIONS

Extended European Search Report from corresponding EP Application No. 22175460.9-1218, Nov. 22, 2022.

* cited by examiner

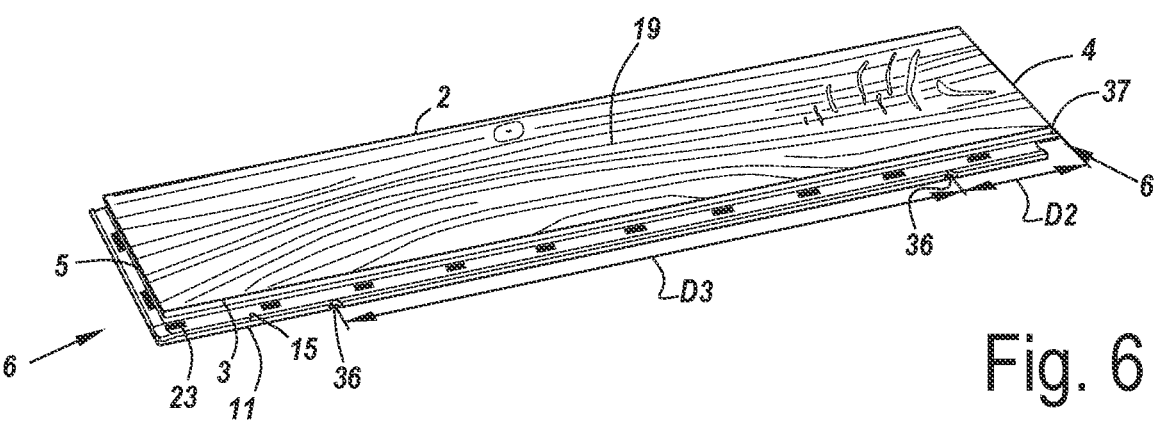
Fig. 6
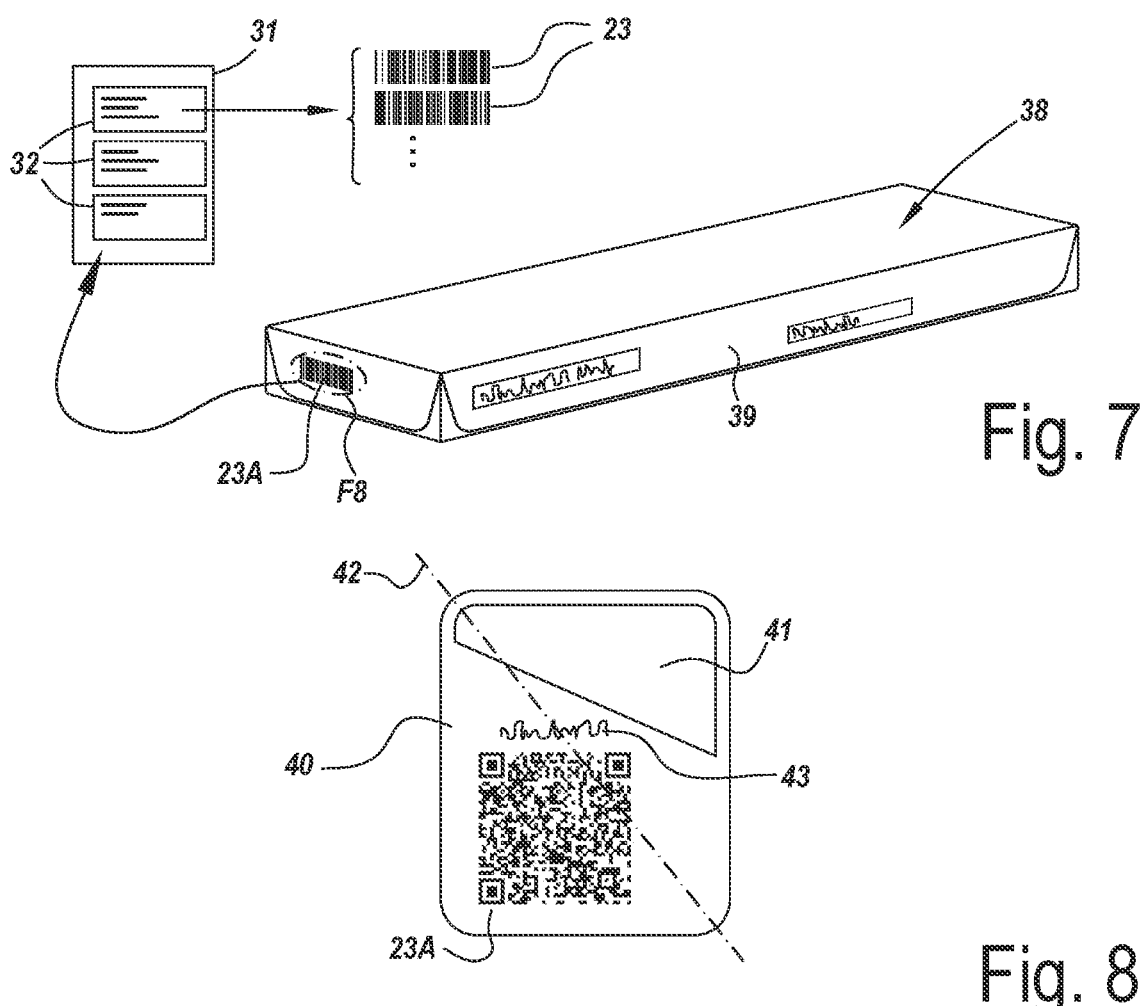
Fig. 7
Fig. 8

PRODUCT, PANEL AND METHOD FOR MANUFACTURING AND/OR AUTHENTICATING AND/OR TRACKING SUCH PRODUCT

BACKGROUND

The present invention relates to products, panels and methods for manufacturing such product. The invention particularly relates to such products and panels that are provided with a code. The invention further related to a method of authenticating such product.

It is known, for example from WO 2013/023844, to print additional markings while printing the decor on decorative building panels or furniture panels. The markings are used in subsequent manufacturing or logistic steps within the factory environment with the aim to minimize incorrect operations. The markings may take the form of a machine readable EAN-code or QR-code and may be used to provide data for subsequent automated machining or for stock control.

In WO 2022/033464, a marking is printed on a ceramic base body to define the printed pattern to be applied in a subsequent production step of a ceramic product.

WO 2019/072733 discloses that, in the manufacturing of decorative panels, a code may be inkjet printed while printing a decorative pattern on a decorative paper or foil. The code is linked to the customer or his delivery address. The code may be concealed within said decorative pattern using steganographic methods.

The markings and codes proposed by the prior art have a limited use, and may distort the print of the eventually obtained building panel. A cost-effective and/or unique identification or tracking of mass produced goods appears impossible with the techniques available in the prior art. In particular, the available techniques do not allow a thorough identification of goods in the market place, during use, or at end-of-life, leading to an unability to pinpoint manufacturing problems underlying after-sales defaulting products, unability to recycle or re-use due to a lack of information on the material contents of the product and/or its hazardous nature.

SUMMARY

The present invention in the first place aims at alternative products and/or panels, wherein, in accordance with preferred embodiments, solutions are offered for one or more of the problems associated with the products or panels of the prior art.

With this aim, the present invention, in accordance with its first independent aspect, is a product comprising a code directly or indirectly linked to data regarding one or more physical parameters and/or the manufacturing of said product and/or of the batch said product is taken from. Due to the fact that the code is linked to such data, the origin of the product may be better retraced. The manufacturing data preferably comprises data regarding the manufacturing steps the actual product has gone through, as opposed to data purely for use in subsequent operations. In this way, the code provided on products defaulting, for example in use, may be helpful in retracing the manufacturing circumstances that may have led to the default.

Preferably, said product is a mass manufactured product, namely manufactured in batches or series of at least 100, or at least 100 thousand, nominally identical, or nearly identical products.

Preferably, said product is a product obtained through a method for manufacturing that comprises at least one machining step, i.e. a forming step, an additive manufacturing step and/or a subtractive manufacturing step, such as sawing, milling, laser cutting, laser milling, laser marking, grinding, sand blasting, waterjet cutting, chemical machining, electrochemical machining and/or electrical discharge machining. Alternatively, or in combination therewith, said product may be a product that at one or more surfaces comprises a coating, wrapping, lamination, decoration and/or printed pattern.

Preferably, said code is unique to the respective product or batch said product is taken from. In the cases where said code is not unique to a product, but used on a plurality of products or on products from one or more batches, said data preferably relates to data in common with all products said code has been applied on, or to data relating to the statistical distribution attained among the respective products or batches.

Whether or not in addition to the unique code in accordance with the above preferred embodiment, preferably, said data allows a, preferably unique or near-unique, identification of said product or of the batch said product is taken from. Herewith it is meant that the data is unique or nearly unique, for a product or batch, for example can maximally relate to 1 out of 100 products or batches, or maximally to 1 out of 100 thousand products or batches. In such case said code may be used in an authentication process. When a product is retrieved in a shop, or at the end-of-life, its authenticity can be checked, by accessing the data through said code, and checking the available data against the physical product. In this manner, a dual authentication may be established with a high probability. Not only should the code be genuine, but also the data linked to it should match the product or batch. An enhanced security can thus be obtained regarding the origin of the product. Such security is of interest in many cases, for example for medicines, audio, video or other data carriers, and so on. It is also of interest for recycling purposes, as it allows to safely retrace the origin of a product to be recycled. For example, when a PVC containing floor or panel product is to be recycled, the data may comprise the types and/or amount of additives used and may be trusted as a reliable source of information seeing the unique or nearly unique identification provided by the present preferred embodiment.

The physical parameters that may be used in the context of the present invention are various, of which here below some possibilities are summed up without desiring to be exhaustive.

According to a first possibility, said one or more physical parameters comprise a physical dimension of said product, such as length, width and/or thickness of said product or a portion of said product. According to a special embodiment, the physical parameter may comprise the number, type or other data regarding one or more of the parts said product is assembled from. For example, a packaged set of decorative panels may comprise a code directly or indirectly linked to data regarding the panels contained in the package. In the case where also the packaged panels comprise a code, the code applied to said packaged set, for example on a visible portion of the packaging material, may be directly or indirectly linked to one or more of the codes applied on the panels contained in the packaged set. Such an embodiment may allow accessing the data linked to the code of the packaged panels, by using the code applied to the packaging material. Checking the data regarding the codes of the packaged panels against the codes of the actually packaged panels may allow to check the authenticity of the code and the packaged set of panels. According to another special embodiment, the physical parameter may comprise the number, type or other data regarding one or more other products with which the product forms an entity, such as a packaged set, an assembled whole, or a kit. For example, the panels in a packaged set of decorative panels may comprise a code directly or indirectly linked to data regarding one or more of the other decorative panels contained in the same packaged set.

It is clear that, even though the practical examples of the first possibility given above are for decorative panels and packaged sets thereof, the first possibility and the special embodiments thereof can be practiced with any product, kit or packaged set of products. It may for example related to medicines, parts for assembly of mechanical, electro-mechanical or electronic devices, digital data carriers, and so on.

According to a second possibility, said one or more physical parameters comprise a photographic image of, or related to, said product or a portion of said product. In the case of a decorative panel, the photographic image may concern an image of, or an image related to, the decoration or a portion of the decoration of the panel. In the case of panels having a decoration at least partially defined by natural materials, such as by means of a wood or stone surface, for example the surface of a wood or stone veneer, an actual photographic image of the decoration or a portion thereof, or of a predecessor of the decoration, may lead to a unique identification of the product, since each natural wood or stone surface is unique. When the available code is read, and the read code is directly or indirectly linked to a photographic image of the decoration of the actual product, or a predecessor thereof, for example to an unvarnished version of a wood veneer that is varnished in the final product, the authenticity of the code and the product can be checked by comparing the data against the decoration of the actual product.

According to a third possibility, said one or more physical parameters comprise a topographical image of said product or a portion of said product. The topographical image may concern data recorded of a relief or structure of the actual product or a portion thereof, for example recorded by means of tactile or optical scanning techniques. In the case of a decorative panel, the topographical image may concern an image of, or an image related to, the structure or structure portion available at one or more of the decorative surfaces. When the available code is read, and the read code is directly or indirectly linked to a topographical image of the structure or structure portion of the actual product the authenticity of the code and the product can be checked by comparing the data against the topography of the actual product.

According to a first special embodiment, the product is provided with a portion having a physical dimension, or other physical parameter, that varies, may vary, or is made to vary from product to product, or from batch to batch, wherein the physical parameter comprises data regarding said physical dimension or parameter, e.g. actual measurement data or data regarding the intended nominal value of said physical dimension or parameter.

According to a second special embodiment which may or may not be combined with the previous special embodiment, said one or more physical parameters are recorded at a location or portion that varies, may vary, or is made to vary from product to product, or from batch to batch. In such case the data preferably also comprises an indication of said location.

Preferably, as is clear from the above, said data comprises measurement data of at least one physical parameter of said product or the batch said product is taken from. The fact that actual measurement data is recorded and stored as at least a part of said data, rather than an intended nominal value may result in a more accurate identification of the product or the batch said product is taken from. Preferably, said measurement data is recorded and stored in said data more accurately than the level of accuracy at which said physical parameter can be obtained in the manufacturing process. For example, said data may comprise a dimension of the product, for example its length or width as measured on a particular predefined location, or on a varying location as identified by said data. The data may be recorded and stored with an accuracy at the micrometer level, while the accuracy of the process defining said dimension is only at an accuracy level of 0.01 mm or worse. Due to the fact that the code directly or indirectly links to data that as so accurate that it is able to record a statistical deviation, a unique or practically unique identification may be obtained. When the available code is read, and the read code is directly or indirectly linked to a said actual measurement data the authenticity of the code and the product can be checked by comparing the data against a measurement at the same accuracy level on the actual product.

The data regarding the manufacturing that may be used in the context of the present invention are various, of which here below some possibilities are summed up without desiring to be exhaustive.

According to a first possibility, said data regarding the manufacturing comprises an indication regarding the products chronological order within said batch said product has been taken from. The data may for example comprise a serial number and/or an indication of the batch size. This data may be useful for third parties to check the volumes of products produced, for example to check legal or imposed quota.

According to a second possibility, said data regarding the manufacturing comprises an indication about the composition of said product and/or recommendations regarding its use and/or its discardment and/or its potential for recycling.

According to a special embodiment, data regarding the chronological order, as mentioned in the first possibility for manufacturing data, is combined with data regarding one or more physical parameters that allow for an authentication of the product, as mentioned above. In this manner a trustworthy check can be made on produced volumes. When the available code is read, and the read code is directly or indirectly linked to a data allowing to check the authenticity of the code, then the data directly or indirectly linked to said code can be seen as trustworthy, when the outcome of said check shows the code is authentic.

Preferably, said code is a scannable code, such as a barcode or a QR code. The code may also comprise alphanumeric values or other signs that are e.g. computer readable.

Preferably, said code is visually perceivable. Visually perceivable codes may be formed by a print and/or formed by structural features, for example by elevations and/or depressions formed in a surface of the respective product.

Preferably, said code is formed by a print. The print may be concealed within a decorative print or pattern, for example using steganographical methods, and/or may be visually perceivable as a scannable code.

In accordance with a special embodiment, the code is composed of two or more subcodes, for example with each subcode being one of a scannable code, a visually perceivable code and/or a print, as explained above. In accordance with the present special embodiment a higher level of security may be attained. Especially in the case where a printed, visually perceivable subcode is combined with a subcode, other than a printed, visually perceivable subcode, for example with a concealed print or with a subcode formed by structural features, copying of the coding is made more difficult.

Preferably, said code is variably, directly or indirectly, linked to a subset of said data, depending on the application used to receive said link and/or on the user desiring to receive said link, and/or, when available, the subcode read. In a particularly preferred embodiment a first subset of said data includes data regarding warranty, installation and/or maintenance. Such a first subset of said data is of interest to the end-consumer and may have a low level of security. Such subset of said data could be retrieved by anyone using said code. A second subset of said data, in accordance with the invention, then includes at least data regarding one or more physical parameters and/or the manufacturing of the respective product or of the batch said product is taken from, as explained above. The second subset of said data may be protected at a higher level of security, and for example only retrievable by authorized users of said code. The trustworthiness of the second subset of said data can preferably be checked by such users by comparing the data against the actual product.

In accordance with the most preferred embodiment of the present invention, said product is a floor or wall covering panel, preferably of the type comprising mechanical coupling parts at at least one pair of opposite edges, wherein said mechanical coupling parts in a coupled condition of two such panels bring about a locking between the respective edges in a vertical direction perpendicular to the plane of coupled panels and/or in a horizontal direction in said plane and perpendicular to the coupled edges. Preferably, said coupling parts have been obtained through a method of manufacturing that at least comprises a milling operation. Preferably, said coupling parts are formed in one piece with the material of the panel. Preferably, said coupling parts are basically formed as a tongue and a groove bordered by an upper and a lower groove lip, wherein said upper and lower groove lip are preferably of unequal length, such that, for example, said lower lip extends beyond said upper lip over a distance being at least half the thickness of said floor or wall covering panel. In such case, said code may be provided on said tongue and/or on said upper or lower groove lip.

Preferably, the product comprises a plurality of codes linking or linkable to said data. The codes are preferably identical or at least linking or linkable to the identical data. As explained above, the codes may also be subcodes linking or linkable to a subset of said data, and/or combinable to a code linkable or linking to said data. In the case of identical codes, or codes linking or linkable to identical data, redundancy is created with the aim of maintaining at least one operable code throughout the lifecycle of the respective product. For example, in the case of a product that may be cut up for mounting or installation, such as is the case with floor or wall panels, the redundancy may lead to a cut up panel comprising at least one operable code.

With the same aim as in the first aspect of the invention, the present invention, in accordance with its second independent aspect, is a panel comprising at least a single- or multilayer board material, wherein said panel is provided with a code at one or more of the edges of said board material.

Preferably, the panel of the second aspect has been obtained through a method for manufacturing that at least comprises a milling, cutting or sawing operation to form said edges.

Preferably, the panel of the second aspect is of the type comprising mechanical coupling parts at at least one pair of opposite edges, wherein said mechanical coupling parts in a coupled condition of two such panels bring about a locking between the respective edges in a vertical direction perpendicular to the plane of coupled panels and/or in a horizontal direction in said plane and perpendicular to the coupled edges. Preferably, said coupling parts have been obtained through a method of manufacturing that at least comprises a milling operation. Preferably, said coupling parts are formed in one piece with the material of the panel. Preferably, said coupling parts are basically formed as a tongue and a groove bordered by an upper and a lower groove lip, wherein said upper and lower groove lip are preferably of unequal length, such that, for example, said lower lip extends beyond said upper lip over a distance being at least half the thickness of said floor or wall covering panel. Said code may be provided on said tongue and/or on said upper or lower groove lip. In the case where the lower groove lip extends beyond the upper groove lip, said code is preferably, at least partially or wholly, provided on the upper surface of the portion of the lower groove lip that extends beyond said upper lip and/or one the bottom surface of the tongue. The bottom surface of the tongue may have a larger surface portion that is easily accessible for equipment applying said code, such as for laser printers and/or for inkjet printers.

The coupling parts preferably comprise locking elements bringing about said locking in said horizontal direction. In the case of coupling parts basically formed as a tongue and a groove, these locking elements preferably comprise a protrusion at the upper surface of the lower groove lip that, in a coupled condition, cooperates with a depression in the bottom of said tongue. Said code is preferably, at least partially or wholly, applied at a location on the upper surface of the lower groove lip and/or on the bottom surface of said tongue, wherein said location is proximal the respective locking element in the case of the groove, and distal the respective locking element in the case of the tongue. In the case of a code applied to the bottom surface of the tongue, said code may extend from any location proximal the tip of said tongue, and preferably up to a location distal said depression, where the code ends. In the case of a code applied to the upper surface of the groove, said code may extend from any location distal the most inner point of said groove, preferably from a location that is located at, or distally located from, the distal end of the upper lip, and preferably up to a location proximal said protrusion, where the code ends.

Applications of codes on the upper surface of a lower lip, e.g. a lower groove lip, and/or on the bottom surface of a male coupling part, such as a tongue, can be executed in the milling machine that profiles the respective edges. In such milling machine, the panels may be transported with their decorative surface facing downwards, such that both the upper surface of the lower groove lip and the bottom surface of the tongue is easily accessible. Application on the bottom surface of the male coupling part is preferred, since the available surface may be larger, and the application of the code may be executed in the direction of gravity, such that the risks of clogging or soiling of the code application device, such as a laser or inkjet printer, are limited.

According to a special embodiment, said coupling parts comprise a male coupling part, e.g. a tongue, wherein the bottom surface of said male coupling part comprises a flat, preferably horizontal or approximately horizontal, portion and/or a female coupling part bordered by at least a lower lip, e.g. comprising a groove bordered by an upper and lower groove lip, wherein the upper surface of said lower lip comprises a flat, preferably horizontal or approximately horizontal, portion. In such case, said code is preferably provided at least partially or wholly on said flat portion of the respective coupling part. In this manner, distortion of the code can be avoided, and the reading of the code can be executed more fluently.

Preferably said panel is a rectangular and oblong panel, having a pair of opposite long edges and a pair of opposite short edges, wherein said code is provided on at least one, but preferably on both edges of the pair of opposite long edges and/or of on at least one, but preferably on both edges of the pair of opposite short edges.

A plurality of said codes may be provided along the length of one or more of said long and short edges. The codes are preferably identical or at least linking or linkable to the identical data. As explained above, the codes may also be subcodes linking or linkable to a subset of said data, and/or combinable to a code linkable or linking to said data. In the case of identical codes, or codes linking or linkable to identical data, redundancy is created with the aim of maintaining at least one operable code throughout the lifecycle of the respective panel.

According to a special embodiment, adjacent codes are located along an edge while maintaining a mutual distance that is shorter than 25 centimeter, and preferably 12 centimeter or less. In this case, the risk that no code is left on a cut-up panel is minimized.

According to another special embodiment, the panel of the second independent aspect is, preferably on an edge and/or on a major surface, preferably not visible in use, such as the bottom surface of a floor panel, provided with a portion that varies, may vary, or is made to vary from panel to panel, or from batch to batch. Such portion may be put to practice in accordance with several possibilities of which here below some are listed without desiring to be exhaustive.

According to a first possibility, that may be combined with the above special embodiment or not, at least two adjacent codes are located along an edge while maintaining a mutual distance that varies, may vary or is made to vary from panel to panel, or from batch to batch. Herein said mutual distance form says varying portion, and data regarding said mutual distance between said codes, e.g. the measured value and/or the intended nominal value, may be stored as a physical parameter in said data in order to allow checking the authenticity of the code. When the available code is read, and the read code is directly or indirectly linked to data regarding said mutual distance, the authenticity of the code and the panel can be checked by comparing said data against the actual mutual distance between adjacent codes on the panel. According to a variant, instead of a mutual distance, the location of any of the codes along the respective edge may vary from panel to panel, or from batch to batch, wherein data regarding this location, i.e. the varying portion is stored in said data, e.g. the measured value and/or the intended nominal value thereof. It is clear that similar advantages are obtained by means of such variant.

According to a second possibility, the panel is at one or more varying locations provided with a structural portion and/or a printed portion, and/or the panels is at one or more locations provided with a portion of varying structure or print. According to a first example, the profile of one or more edges that are otherwise continuous, or varying in a predefined manner, are provided with one or more portions interrupting the continuity or predefined variation. For example, an edge comprising the profile of a coupling part, for example a coupling part basically shaped as a tongue, or a groove, wherein this profile is otherwise continuous along the respective edge, is provided with an incision, an indentation or an excavation at one or more locations along said otherwise continuous profile. The location of one or more of the incisions, indentations or excavations, and/or their dimensions, i.e. width, length and/or depth, may vary from panel to panel, or from batch to batch. According to a second example, one or more of the edges and/or surfaces, preferably not visible in use, are provided with one or more printed features other than said code. The location of said printed feature, and/or the printed feature itself may vary from panel to panel, or from batch to batch, wherein data regarding the location and/or the printed feature itself is stored in said data.

It is clear that the panel of the second independent aspect may show the features of the product of the first independent aspect and/or the preferred embodiments thereof.

With the same aim as in the previous aspects, the present invention in accordance with a third independent aspect is a method for manufacturing a product, wherein the method comprises the step of providing a product in finished or semifinished form;

the step of applying a code to said product; said code being preferably unique or near unique to said product or to a batch of said products, and providing a direct or indirect link, or being linkable, to digital data, e.g. stored on a digital data carrier;

the step of recording measurement data regarding one or more physical parameters of said product or batch and/or manufacturing data regarding said product or batch, and storing said measurement data and/or manufacturing data, e.g. on said digital data carrier, such that the respective data is directly or indirectly accessible by means of the link provided by said code, and/or, the step of providing said product with a portion that varies, may vary, or is made to vary from product to product, or from batch to batch, and storing data regarding the specific portion, i.e. the particular variation or said portion provided on said product, e.g. on said digital data carrier, such that the respective data is directly or indirectly accessible by means of the link provided by said code.

As is explained in the context of the first and second aspect, the combination of a code and the specific data regarding the product or batch said product is taken from, may be used to check the authenticity of the product and the code.

It is noted that the step of applying said code, and the step of storing and/or recording data may be executed in any order, or may be executed simultaneously.

It is clear that the method of the third aspect is particularly well suited to manufacture a product or panel having the characteristics of the first and/or second aspect and/or the preferred embodiments thereof.

With the same aim as in the previous aspects, the present invention, in accordance with a fourth independent aspect, is a method for authenticating a product, preferably a decorative panel, wherein the product comprises a code directly or indirectly linked to data regarding one or more physical parameters and/or the manufacturing of said product or of the batch said product is taken from, wherein said method comprises:

the step of accessing said data by means of said code;

the step of checking said data against said product.

Preferably, said data comprises data that allows a unique, or near-unique, identification of said product or of the batch said product is taken from.

Preferably, said code is unique to said product or the batch said product is taken from.

It is clear that said data may be data regarding one or more of the physical parameters, measurement data, nominal values, statistical distributions, manufacturing data, variable portions, as mentioned in the context of any of the previous independent aspects.

It is further clear that the method of the fourth aspect may be conveniently applied to authenticate the products and panels described by means of the first, second and/or third aspect and/or the preferred embodiments thereof.

It is remarked that the data, or subsets of data, is preferably stored on a digital data carrier. Preferably the data is stored in an encrypted manner. Preferably the data can be deciphered using a key of at least 128 bits or at least 2048 bits. The key can be code, product and/or batch specific, and for example be provided by a trusted source, such as by the owner of the data, or by the keeper of the data, to a trusted user. In this way, the stored data is more secure against unauthorized reading and/or writing. The provision of the key and/or the deciphering can be executed by means of an algorithm running at or shortly after the time of machine reading said code. In this manner the user interested to access the data may not even notice the encryption.

Preferably, the digital data carrier is a central digital data carrier, e.g. managed by a label emitting party. It is however not excluded that the data is distributed over a plurality of digital data carriers, or that the same data or subset thereof is stored on a plurality of digital data carriers, for example in order to create redundancy or more fluent access. The access to the data or any subset should however, preferably, remain possible through the link provided by said code, even it said data or subset thereof is e.g. distributed over several digital data carriers.

As already noted, the products, panels and methods of the first to fourth aspects are particularly well suited for products that are manufactured in large volumes of identical or nearly identical products, e.g. for products or panels manufactured in batches or series of at least 100, or at least 100 thousand, nominally identical, or nearly identical products. The code used in the present invention may be unique or nearly unique to each such otherwise identical or nearly identical product, thereby allowing to access the unique or nearly unique data concerning the physical parameters and/or manufacturing of the respective product, and potentially, as explained in the above, allowing an authentication of the product by checking the data linked to said code against the actual product.

With the same aim as in the previous aspects, the present invention, in accordance with its fifth independent aspect is a packaged set of floor and/or panel products, with as a characteristic that said packaged set comprises a label having both at least one security feature and at least a code directly or indirectly linked, or linkable, to data regarding said label and/or said products. Said security feature may serve as a warranty that the data linked or linkable to said code is authentic. Preferably the label is attached to said packaged set in an irreversible manner, i.e. it may not be removed without damage to the label and/or packaged set. The attachment or irreversible attachment may be achieved by using adhesive means that are made of or comprise rubber, acrylic or an acrylic blend.

For said security feature, one or more of several options may be chosen. For example, said security feature may be or may comprise a hologram. The hologram may be a complex hologram having visible and invisible features. The invisible features may have the form of hidden or micro-text, or even encoded information, such as cryptograms, which can for example only be read using specific tools such as special lenses, microscopes, or lasers. According to an alternative, or in combination with a hologram, said security feature may comprise a security strip, micro-lettering, a fluorescent portion, a watermark, intaglio, steganographic printed data and the like.

Preferably said code is a scannable code, a barcode and/or a QR code. Preferably said code is unique to said packaged set of floor and/or panel products.

Preferably, said security feature and said code are positioned adjacently on the label, preferably without overlaps. In such case the machine reading of the security feature and/or the label can be made more fluently using devices such as a smartphone. Preferably the code is positioned on a portion of the label that has a uniform or nearly uniform color, for example on a portion having a maximum color difference Delta E smaller than 45, or smaller than 25, as expressed in the CIELAB color space and all, preferably as measured in accordance with ISO/CIE 11664-4:2019. Preferably, the color of said portion has an average L-value of 70 or higher, or even of 85 or higher, as expressed in the CIELAB color space and all, preferably as measured in accordance with ISO/CIE 11664-4:2019.

Preferably, said security feature and said code are diagonally positioned on said label. With a diagonal placement it is meant that the security feature and the label are mainly located on areas adjacent to opposite corners of the label, and/or that their center points and/or their main portions are located at respective sides of a diagonal, or radial line, defined by the shape of said label. By such positioning a maximum surface of an otherwise compact label can be used to display the code. In this manner the code can be displayed large enough to make it fluently readable using devices such as a smartphone, without requiring a label with a large surface. The label may generally have a rectangular shape, for example with rounded corners, or be oval or circular. Any other shape is possible.

Preferably, said label is adhesively connected to said packaged set, for example by means of an irreversible adhesive and/or by means of an adhesive made of or comprising rubber, acrylic or an acrylic blend.

Preferably, said packaged set comprises a box at least partially or wholly containing said products, and a foil wrapped around said box, wherein said label is covered by said foil, and said label preferably attached to said box. Preferably said foil is translucent or transparent, for example a shrink fitted wrapping foil.

Preferably, said label displays a, preferably unique or nearly unique, number. Preferably, said data at least comprises said number. In such case, it is possible to have a dual check of the authenticity of the products or set of packaged products, namely by checking whether the data linked to the code displays the number on the label.

The access of the data through the link provided by said code may be protected by a password or another check. The password or check may be available in the security feature or as a different portion of said label or the product it is attached to. The password or check may for example be or be based on said unique or nearly unique number. The password or check may also be created by any of the stakeholders in the logistic chain, or be based on product or invoice data. For example, the end-consumer may be requested to input one or more physical parameters of the product before being able to enter the data or a subset thereof.

Preferably, said data allows a, preferably unique, or near unique, identification of said label, said product, said packaged set, or the batch said packaged set or products are taken from. The data may be used in an authentication process, as described in the context of the first, third and/or fourth aspect and/or the preferred embodiments thereof.

Said data may comprise data regarding one or more physical parameters and/or regarding the manufacturing of said product, said packaged set or of the batch said product is taken from. Said one or more physical parameters may relate to one or more of the possibilities mentioned in the context of the first aspect, and preferably comprise a, nominal or actual, physical dimension of the packaged products, such as their nominal or actual length L, width and/or thickness, and/or the total surface are that can be covered with the products contained in the packaged set.

Said data may comprise data regarding the manufacturer, date of manufacturing, the shipper, date and/or place of shipment, the distributor, date and/or place of distribution, the sale to an end consumer, date and/or place of such sale, and/or the place and date of installation. Such data allows to track the logistic chain that the packaged set has gone through.

Said data may comprise data regarding the warranty, installation instructions, and/or advice on maintenance of the product. An end-consumer may easily retrieve such information through accessing the link provided through said code.

Said data may comprise an indication about the composition of said product and/or recommendation regarding its use and/or discardment and/or its potential for recycling and/or its ecological impact.

Preferably, said code is variably, directly or indirectly, linked to a subset of said data, for example depending on the application used to receive information from said link and/or on the user desiring to receive information from said link. For example, an end-consumer may be able to retrieve data regarding the warranty, installation instructions and/or advice on maintenance of the product, while being unable to track the entirety of the logistic chain the product, or packaged set, has gone through. A label emitting party may however be able to access the entirety of the data linked to said code.

It is clear that offering a fluent way of tracking a product, more particularly a set or a packaged set of products, is convenient in many instances, for example to be able to deal with the product at the end-of-life, or to check whether the product, or set of products is genuine. Therefore, in accordance with a sixth independent aspect, the present invention is a method for tracking a set of floor and/or panel products, characterized in that said method comprises at least the following steps:

the step of manufacturing said set of floor and/or panel products by a manufacturer;

the step of shipping, selling and/or distributing said set by respectively a shipping company, a retailer and/or a distributor, wherein the shipping, selling and/or distributing of said set is made together with a label having at least a code providing a direct or indirect link, or being linkable, to digital data, e.g. stored on a digital data carrier, wherein said label preferably also has at least one security feature; and the step of storing data regarding said set or said products and making it accessible by means of said link.

Preferably, said method is applied for tracking a packaged set of floor panels as in the fifth independent aspect and/or the preferred embodiments thereof.

Said label is preferably provided by one or more label emitting parties, wherein said digital data is preferably stored on a digital data carrier managed by one or more of said label emitting parties.

Preferably, said step of storing a data, comprises the manufacturer, the shipping company, the retailer and/or the distributor storing at least a part of said data. Each of these parties may store the data part that is in its interest and/or in its possession and/or under its management. For example, the manufacturer may store data regarding the date and place of manufacturing, the composition of the material of the products. The distributor may store data regarding warranty, installation and/or maintenance. The retailer may store data regarding place and/or date of sales to an end-consumer. It is not excluded that the end-consumer also stores certain data. The data uploaded by the end-consumer may for example serve to check the authenticity of the original data. For example the end-consumer may be asked to put in a, nominal or actual, physical dimension of the packaged products, such as their nominal or actual length L, width and/or thickness, and/or the total surface are that can be covered with the products contained in the packaged set. A mismatch between the data uploaded by the end-consumer and the data uploaded by any of the previously named parties may lead to the identification of malicious practices. The end-consumer may be incentivized to put in data by means of a lottery or otherwise.

The method of the sixth aspect preferably further comprises the step of accessing said data or a subset thereof by means of the link provided by said code, wherein said step of accessing is preferably executed at least by one or more of the end consumer, the installer, the retailer, the distributor, the shipping company and/or the manufacturer. Preferably, said method further comprises the step of storing location and/or identity information regarding one or more of the parties executing said step of accessing and/or said step of storing data. In this way the logistic chain of the product or set of products can optimally be supervised. The method may further comprise the step of sanity checking said location and/or identity information. For example, if said data linked to a particular code already comprises data regarding the shipment of a product or set of products, it is nearly impossible, or highly suspicious, that new shipment data would be uploaded. The same goes for data regarding a sales to an end-consumer. Sanity checks can also be performed by checking the lapsed time between two events, for example between manufacturing date and sale to an end-consumer. Performing such sanity checks, preferably, is combined with identifying forgery of said label and/or product.

Preferably, said method further comprises the step of at least partially locking said access. According to a first example, after a party with a particular function, e.g a shipping party, has stored data, further storing of data by a party having the same function, for example another shipping party, may be prevented by locking access to said data in a way that the data, from then on, can only be read by a shipping party. Storing of data by a subsequent party may also be delayed until the access of the previous party is at least partially locked. According to a second example, upon storing data regarding a final sale to an end-consumer the data linked to said code may be set to read-only for one, two or more or all of the manufacturer, shipping company, distributor, retailer and/or label emitting party.

Said method may further comprise the step of activating said label by any of the manufacturer, the shipping company, the distributor and/or the retailer. The activation of said label may comprise the creation of a data record linked to said code. Alternatively the label may be activated by one or more of said label emitting parties.

Preferably, the method of the sixth aspect and/or its preferred embodiments is in common between a plurality of manufacturers, shipping companies, distributors and/or retailers. Preferably, the number of label emitting parties is smaller than the number of manufacturers having said method in common.

It is noted that the label emitting party may depend on a feature of said floor or panel products, for example on the type of mechanical coupling parts used on said floor or panel product, when available.

It is further noted that codes that are concealed within the decorative top layer, for example within the printed pattern may be achieved by means of such methods as disclosed in inter alia US 2022/0301094 and/or US 2022/0388213, both incorporated herein by reference.

BRIEF DESCRIPTION OF THE DRAWINGS

With the intention of better showing the characteristics of the invention, hereafter, as examples without any limitative character, some preferred embodiments are described, with reference to the accompanying drawings, wherein:

FIG. 6 shows a perspective view on the area indicated by F6 in FIG. 5;

FIG. 7 illustrates another embodiment in accordance with the invention;

FIG. 8 at a larger scale shows a view on the area indicated with F8 in FIG. 7;

DETAILED DESCRIPTION OF THE INVENTION

For ease of understanding the disclosed embodiments of the panel product and associated method and system elements, a description of a few terms, when used, is convenient. The term 'computer-readable code' may refer to a machine-readable identifier presented on a panel product or label in a machine-readable form (e.g., a 2D or 3D barcode, QR-code, or scannable code). A computer-readable code may additionally or alternatively be presented in a matter that enables it to be read electronically, such as through use of a magnetic strip, a chip with microprocessor enabling near-field communication, a RFID tag, etc. In some embodiments, computer-readable codes are also presented in human-readable form. Computer-readable codes can be associated or applied to panel products or labels in a tamper-resistant manner, such as through the use of machine etching, laser etching, thermal transfer, holograms, embedded within any layer or portion of the panel product and the like.

The term 'panel product' may refer to a structural floor or wall panel, a decorative panel, an engineered board, or packaging for such panels.

The term 'computer storage media' may refer to physical storage media that store computer-executable instructions and/or data structures. Storage media, such as a digital data carrier, includes computer hardware, such as random access memory (RAM), read-only memory (ROM), electrically erasable programmable ROM (EEPROM), solid state drives (SSDs), flash memory, phase-change memory (PCM), optical disk storage, magnetic disk storage, and the like.

The term 'network' may refer to one or more data links that enable the wired or wireless transport of electronic data between computer systems and/or modules and/or other electronic devices.

The term 'processor' may refer to one or more devices, circuits, and/or processing cores configured to process data, such as computer program instructions, and includes personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The term 'scanner device' may refer to optical scanners, laser scanners, RFID scanners, magnetic readers, smartphones, and the like.

The term 'supply chain party' may refer to a manufacturer, a shipper, a retailer, a distributor, and/or a customer.

Figures 1, 2, 3:
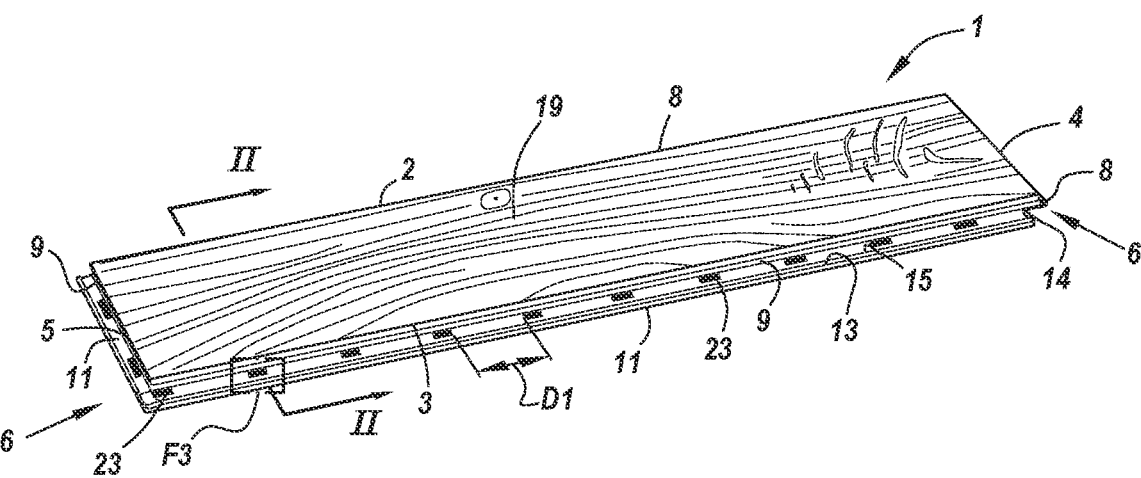
FIG. 1 in perspective view shows a product with the characteristics of the present invention.
FIG. 2 at a larger scale shows a cross-section in accordance with line II-II of FIG. 1.
FIG. 3 at a larger scale shows a view on the area indicated with F3 in FIG. 1.

FIG. 1 shows a product, in this case a rectangular floor panel 1 with a long pair of opposite edges 2-3 and a short pair of opposite edges 4-5. The panel comprises coupling part 6 at both pairs of opposite edges 2-3;4-5.

FIG. 2 shows the coupling parts 6 at the long pair of opposite edges 2-3. As illustrated with the dashed line 7, these coupling parts 6, in a coupled condition, bring about a locking between the respective edges 2-3 in a vertical direction V perpendicular to the plane of coupled panels 1 and/or in a horizontal direction H in said plane and perpendicular to the coupled edges 2-3. The coupling parts 6 are mainly formed as a tongue 8 and a groove 9 bordered by an upper groove lip 10 and a lower groove lip 11, wherein the upper groove lip 10 and lower groove lip 11 are of unequal length. In this case, the lower groove lip 11 extends in said horizontal direction H beyond the distal end 12 of said upper groove lip 10. The distance D by which said lower groove lip 11 extends beyond said upper groove lip 10 is at least half the thickness T of the floor panel 1.

FIG. 2 further clearly shows that the tongue 8 and groove 9 are provided with locking elements 13-14 bringing about said locking in said horizontal direction H. In this case the locking elements comprise a protrusion 13 at the upper surface 15 of the lower groove lip 11 and a depression 14 in the bottom surface 16 of the tongue 8.

The coupling parts 6 have been obtained through a method of manufacturing that at least comprises a milling operation.

The panel 1 of the example comprises a substrate 17 and a decorative top layer 18 with a decorative, preferably printed, pattern 19. In this case, the coupling parts 6 of at least the long pair of opposite edges is provided, more particularly by means of miling, in one piece with the material of the substrate 17. In this case, the substrate 17 is a board material and may be formed from MDF, HDF, filled synthetic composite, such as filled thermoplastic material, wood, plywood, cork and/or comprise polyurethane, polyvinylchloride, polyethylene, polypropylene, polyethylene terephthalate, and/or unsaturated polyester. In the represented case, the decorative top layer 18 comprise a wear layer 20 applied on top of a printed carrier sheet 21. At the bottom of the substrate 17 a balancing or backing layer 22 is illustrated, but may be omitted.

As illustrated in FIG. 1, the panel 1 comprises a plurality of, in this case identical, codes 23 applied to the long pair of opposite edges 2-3, as well as to the short pair of opposite edges 4-5. The codes 23 maintain a mutual distance D1 that is shorter than 25 centimeter. The codes are wholly applied at a location on the upper surface 15 of the lower groove lip 11, wherein said location is proximal the respective locking element 13. The code 23 extends from a location 24 distal the most inner point 25 of said groove 9 and distally located from the distal end 12 of the upper lip 10, and up to a location 26 proximal said protrusion 13, where the code 23 ends. Alternatively, or in combination therewith, as illustrated with the dashed line 27, a code 23 may be applied wholly on the bottom surface 16 of said tongue 8, wherein said code 23 extends from a location 28 proximal the tip 29 of said tongue 8 up to a location 30 distal said depression 14, where the code 23 ends. Indeed, the code 23 may be applied or associated with the panel product in any manner feasible to enable identification or scanning thereof for tracking a panel product.

FIG. 3 illustrates that, in the example, the codes 23 are barcodes and such code 23 is directly linked to data 31 regarding one or more physical parameters and/or the manufacturing of said panel 1. As explained in the introduction, said data 31 may allow an authentication of the panel 1 and/or the code 23. The data 31 may comprise data 31 regarding the mutual distance D1 between said codes 23. Preferably, the mutual distance 31 is varying from panel 1 to panel, such that the data 31 regarding the mutual distance D1 may be used to authenticate the code 23 and/or the panel 1 as explained in the introduction.

FIG. 3 further illustrates that the data 31 may contain several subsets 32 of data 31, and the code 23 may be variably linked to a one or more of such subsets 32, e.g. depending on the application used to receive said link.

It is clear that the panel 1 illustrated in FIGS. 1 to 3 forms an example of a product having the characteristics of the first aspect and of a panel 1 having the characteristics of the second aspect of the invention mentioned in the introduction.

Figure 4:
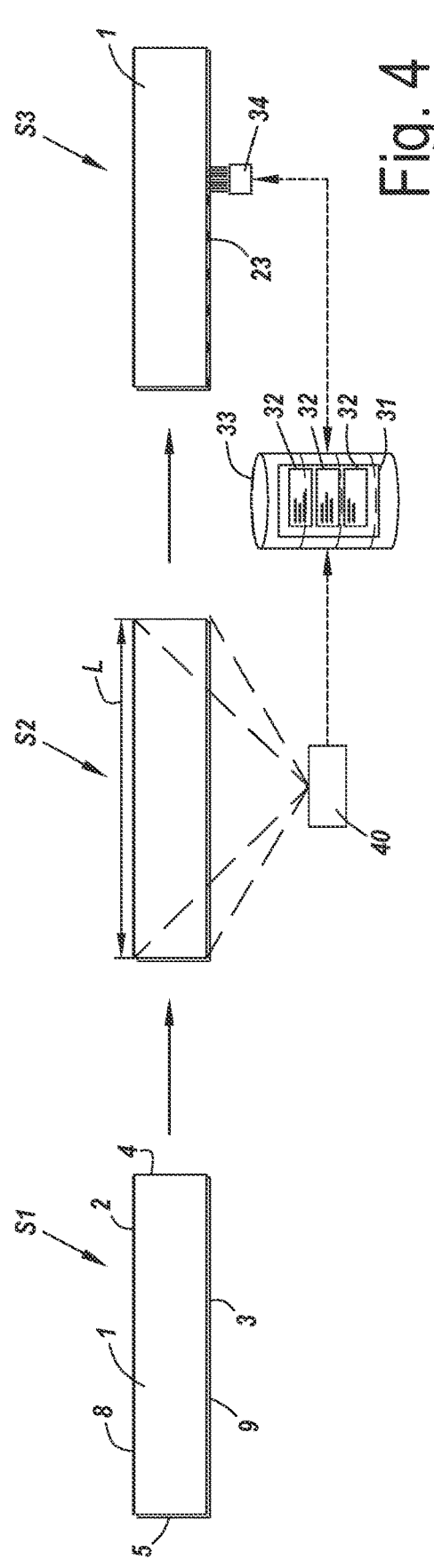
FIG. 4 schematically illustrates some steps in a method with the characteristics of the third independent aspect.

FIG. 4 illustrates a method for manufacturing a product, in this case a floor panel 1. The method comprises the step S1 of providing the panel 1, in this case in a finished form. In a step S2 measurement data is recorded using an, in this case optical, measurement device 40 regarding one or more physical parameters of said panel 1. The measurement data may comprise a photographical image of at least a portion of the decorative pattern 19 and/or a physical dimension of said panel 1, such as a length L of the panel 1 or the decorative pattern 19. At least part of said measurement data is then stored, in an encrypted manner, on a digital data carrier 33. As illustrated, in a subsequent step S3, a code 23 is applied to said panel 1, wherein the code 23 is unique to said panel 1 and provides a direct link to at least part of the data 31 recorded in the step S2 and stored on said digital data carrier 33. In this case, the code 23 is applied by means of a printer device 34, for example a laser printer or an inkjet printer.

Figure 5:
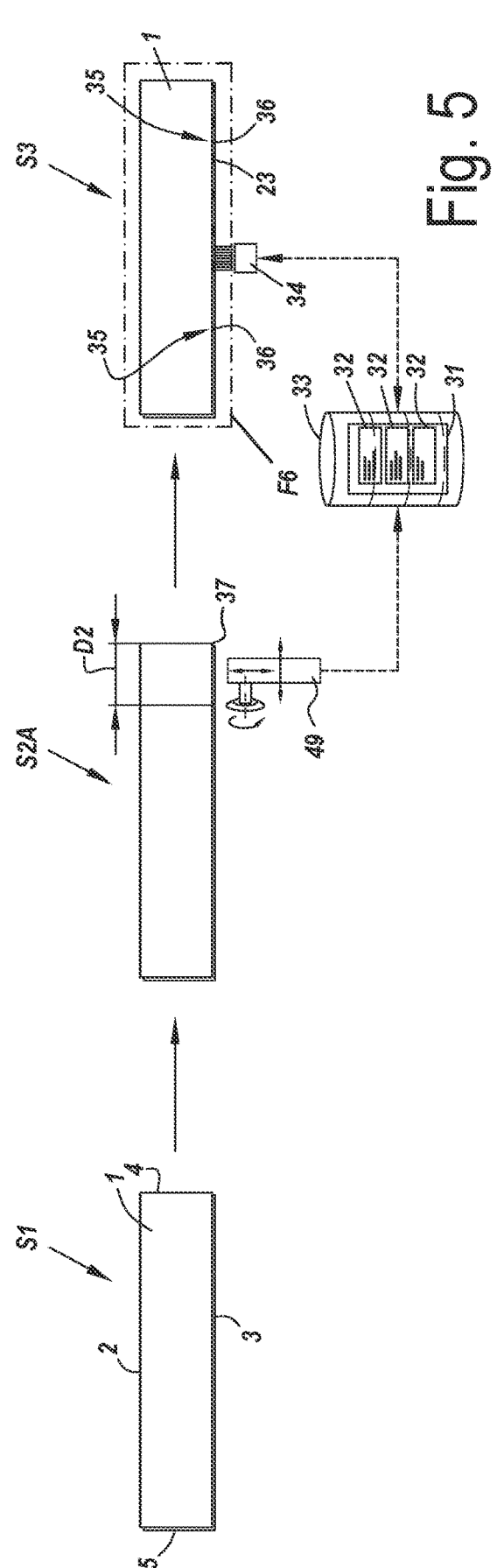
FIG. 5 in a similar view illustrates an alternative.

FIG. 5 illustrates a method for manufacturing a product, in this case a floor panel 1 as well. The method comprises the step S1 of providing the panel 1. In a step S2A the panel 1 is provided with a portion 35 that varies from panel 1 to panel. In this case, an incision 36 is provided in the lower groove lip 11, and the location of the incision 36 varies from panel 1 to panel. A cutting device 49, such as a flooring cutter, saw, or panel cutter, may be used to make the incision 36. Data regarding the location of the incision 36 is then stored, in an encrypted manner, on a digital data carrier 33. In an embodiment, the cutting device 49 may communicate with the digital data carrier 33 and convey information regarding the incision 36. As illustrated, in a subsequent step S3, a code 23 is applied to said panel 1, wherein said code 23 is unique to said panel 1 and provides a link to the stored data 31. The data 31 regarding the location of said incision 36 may for example be the distance D2 from a corner 37 of the panel 1 to the center of said incision 36, or, in the case several incisions 36 are made, as shown in FIG. 6, the mutual distance D3 between the incisions.

It is clear that the panels obtained by means of the methods illustrated in FIGS. 4 to 6 are examples of products in accordance with the first aspect of the invention, and panels 1 in accordance with the second aspect of the invention mentioned in the introduction.

FIG. 7 shows a packaged set 38 of floor panels, wherein the packaged set 38 comprises a code 23 applied to a visible portion of the packaging material 39. Said code 23A is linked to data 31 regarding the number, type or other data regarding the panels contained in the packaged set 38. More particularly, the code 23A applied to the packaging material 39 is, in this case, linked to the codes 23 applied on each of the panels contained in the packaged set 38.

FIG. 8 shows that the packaged set 38 of floor panels may comprise a label 40 having both a security feature 41 and a code 23A, wherein the code 23A is linked or linkable to data regarding said label and/or said floor panels. In this case the security feature 41 is a hologram, and the code 23A is a QR code. The security feature 41 and the code 23A are positioned adjacently on the label 40 without overlaps. In this case the label has globally a rectangular shape, with the security feature 41 and the code 23A being positioned diagonally on said label 40. As illustrated by means of the diagonal 42, the main portions of the security feature 41 and the code 23A are positioned at respective sides of this diagonal 42. The label 40 further displays a unique number 43.

Figure 9:
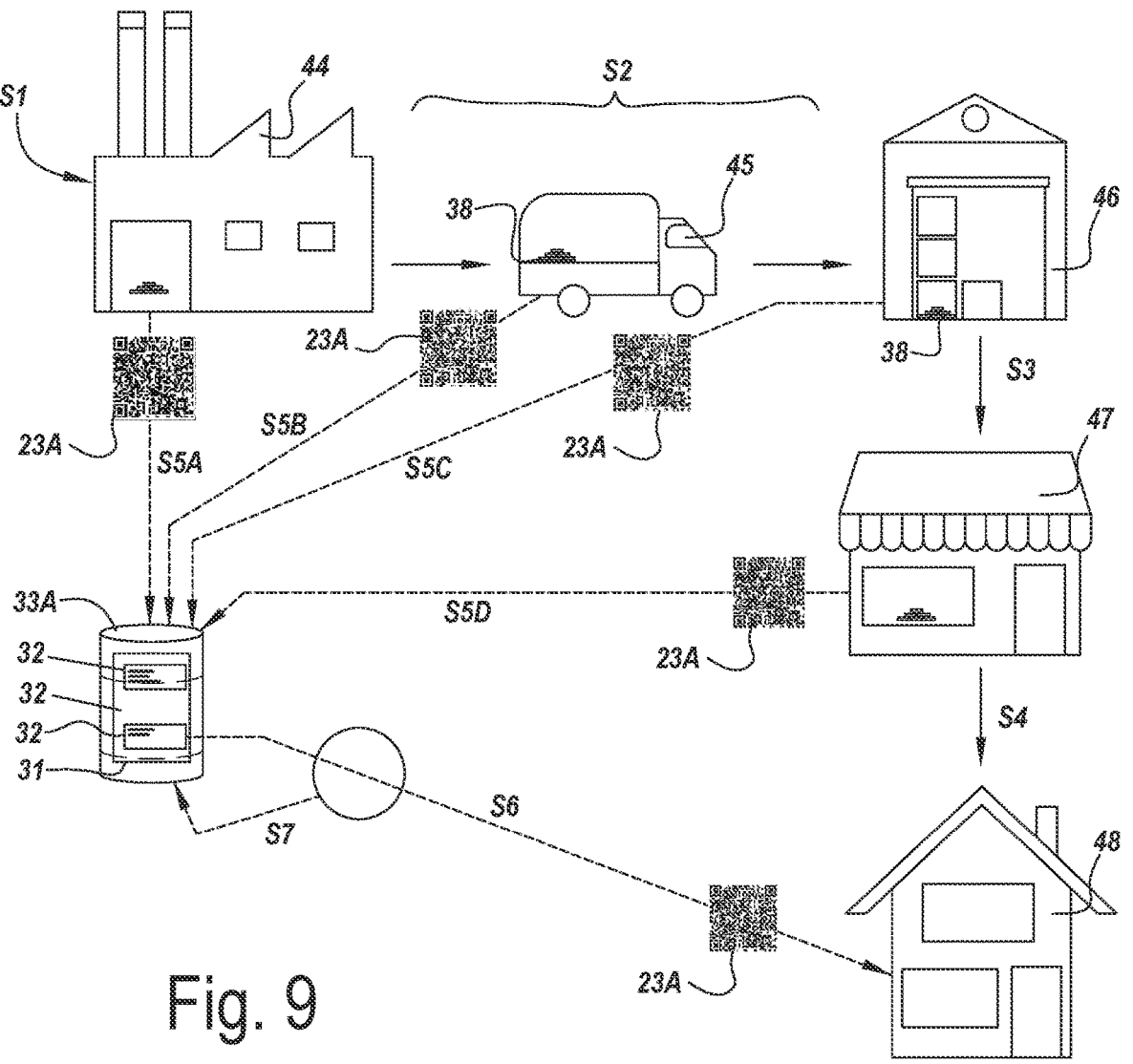
FIG. 9 schematically illustrates some steps in a method in accordance with the sixth aspect of the invention.

FIG. 9 illustrates a method for tracking a, preferably packaged, set 38 of floor products, in this case floor panels, for example the set 38 of floor panels shown in FIG. 7. The method includes the step S1 of manufacturing said set 38 of floor panels by a manufacturer 44. The step S1 of manufacturing may include such substeps as an extrusion operation, a pressing operation, a lamination operation, a dividing operation, a milling operation, a packaging operation. In the manufacturing at least a code 23A is applied to the set 38 of floor panels. Preferably the manufacturer 44 activates said label 40 or code 23A. The illustrated method further comprises a step of shipping S2, distributing S3 and selling S4 said set 38 of floor panels, respectively by a shipping company 45, a distributor 46 and a retailer 47. These steps S2-S3-S4 are made together with at least said code 23A attached to said set 38. Preferably, said code 23A is available on a label 40, e.g. like the one illustrated in FIG. 8, having both a security feature 41 and said code 23A.

The method of FIG. 9 further comprises a step S5A-S5B-S5C-S5D of storing data 31 or subsets 32 thereof regarding said set 38 of floor panels. The data 31 or subsets 32 thereof are accessible by means of a link provided by said code 23A. As illustrated here, the method comprises the step S6 of accessing the data 31 or a subset 32 thereof by the end-consumer 48 or installer. The execution of the step S6 gives rise to the step S7 of storing location and/or identity information regarding the end-consumer 48 or installer accessing the data 31 or a subset 32 thereof through the link provided by said code 23A.

As shown here, the data 31 and any subset 32 is stored on a central digital data carrier 33A managed by a label emitting party. It is however not excluded that the data 31 is distributed over a plurality of digital data carriers 33, or that the same data 31 or subset 32 thereof is stored on a plurality of digital data carriers 33, for example in order to create redundancy or more fluent access. The access to the data 31 or any subset 32 should however remain possible through the link provided by said code 23A.

FIG. 9 illustrates the logistic chain of a single set 38 of floor panels. It is however clear that an identical logistic chain is followed by a plurality of such sets 38. Each of these sets 38 preferably follows the logistic chain together with a unique label, security feature and/or code. In that way individual data about each set 38 can be accessed through the link provided by means of the unique code.

Figure 10:
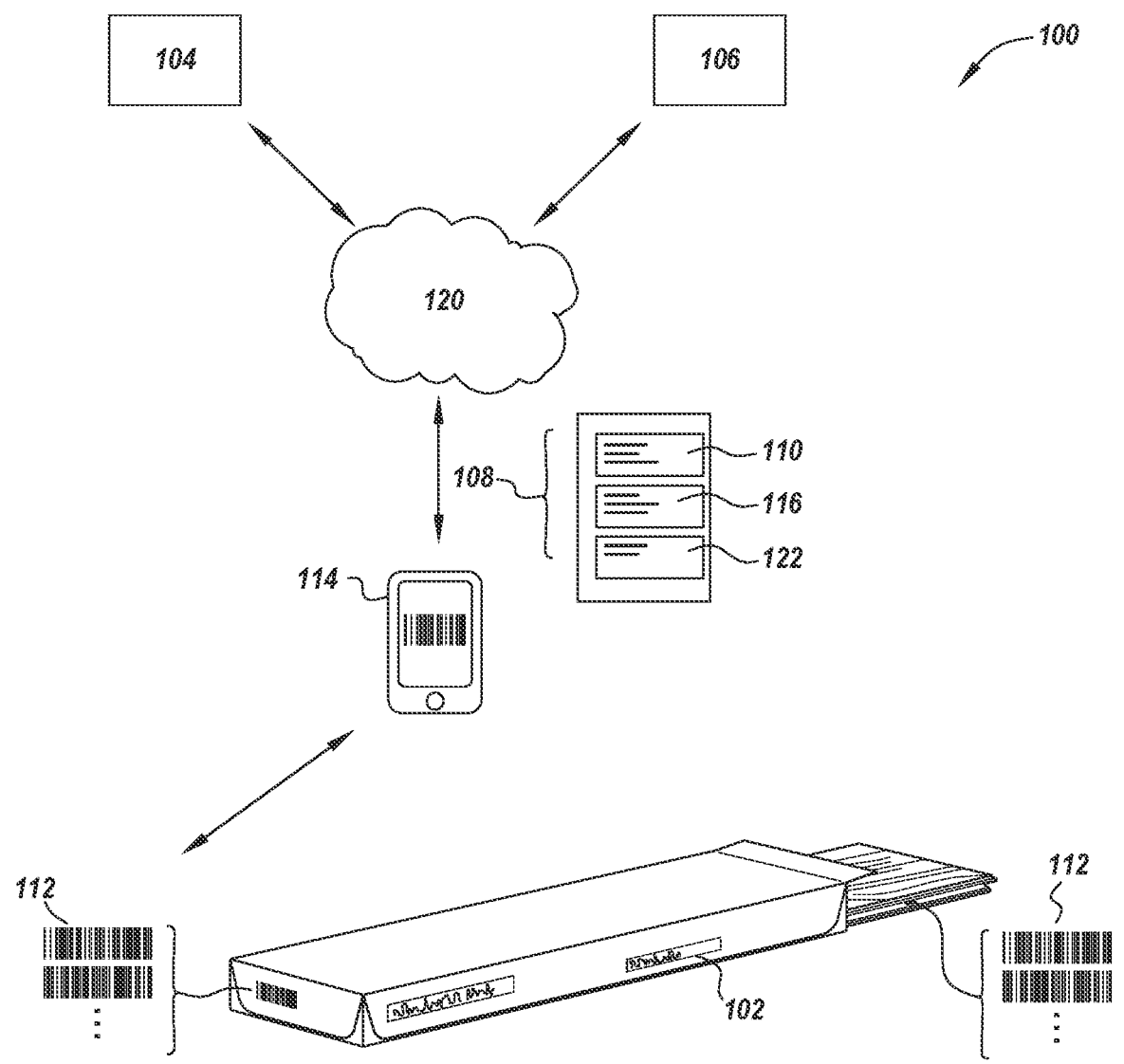
FIG. 10 illustrates a system for tracking at least one panel product.

FIG. 10 illustrates a system 100 for tracking at least one panel product 102 for making a floor covering. The system 100 comprises at least one processor 104, at least one computer storage media 106, at least one computer-readable code 112, and at least one scanner device 114. The computer storage media 106 stores computer-traceable data 108 managed by the processor 104. The computer-traceable data 108 is analogous to the aforementioned data 31. The computer-traceable data 108 comprises digital data 110 regarding the panel product 102. The digital data 110 regarding the panel product 102 is analogous to the aforementioned subsets 32 of data 31. The computer-readable code 112 is arranged for placement on the panel product 102 and is analogous to the aforementioned code 23. The computer-readable code 112 provides a link to the digital data 110 that is stored on the computer storage media 106 The scanner device 114 is configured to read the computer-readable code 112 and transfer code-specific information 116 of the computer-readable code 112 to the processor 104. The computer-traceable data 108 comprises the code-specific information 116 of the at least one computer-readable code 112.

Like the embodiments disclosed with respect to FIGS. 1-8, the computer-readable code 112 may be carried by a surface of the at least one panel product 102. The computer-readable code 112 is preferably concealed, at least after installation of the panel product 102 for making a floor covering or wall panel covering. The computer-readable code 112 may be concealed by being placed on a surface that is not visible after installation and/or by being provided in a concealed manner, e.g. provided in the decorative pattern 19 in particular by means of steganography. In the latter case, the computer-readable code 112 thus concealed may be present on a surface that is in itself visible in use. The computer-readable code 112 may for example form part of the decorative pattern 19, or of a relief provided on or in the decorative top layer 18. In an embodiment, the processor 104, computer storage media 106, and scanner device 114 are communicatively coupled by a network 120 for enabling the transfer for the computer-traceable data 108. The link to the digital data 110 provides access to information of one or more parameters 122 of the panel product 102 to verify authenticity of the panel product 102. The information of one or more parameters 122 of the panel product 102 comprises one or more physical parameters, one or more manufacturing parameters, or both physical and manufacturing parameters of the panel product 102. Due to the fact that the computer-readable code 112 is linked to such computer-traceable data 108, the origin of the panel product 102 may be better retraced. The information of one or more parameters 122 regarding manufacturing data preferably comprises data regarding the manufacturing steps that the actual product has gone through, as opposed to data with respect to purely a reference product, or purely a primary SKU number, or purely for use in subsequent operations. In this way, the computer-readable code 112 provided on panel products 102 defaulting, for example in use, may be helpful in retracing the manufacturing circumstances that may have led to the default.

In an embodiment the information of one or more parameters 122 of the at least one panel product 102 comprises a measurement defining a mutual distance between a first code and a second code, similar to the embodiment described with respect to FIG. 4. In an embodiment, the mutual distance is made to vary between panel products 102 or a set or batch of panel products. When the available computer-readable code 112 is read, and the read computer-readable code 112 is directly or indirectly linked to information of one or more parameters 122 regarding said mutual distance, the authenticity of the computer-readable code 112 and the panel product 102 can be checked by comparing computer-traceable data 108 against the actual measured mutual distance between adjacent computer-readable codes 112 on the panel product 102. According to a variant, instead of a mutual distance, the location of any of the computer-readable codes 112, e.g. along the respective edge, may vary from panel to panel, or from batch to batch, wherein computer-traceable data 108 regarding this location, i.e. the varying portion, is stored in the computer-traceable data 108, e.g. the measured value and/or the intended nominal value thereof. It is clear that similar advantages are obtained by means of such variant.

In an embodiment the information of one or more parameters 122 comprises a photographic image corresponding to the panel product 102. The information of one or more parameters 122 of the at least one panel product 102 preferably comprises a physical dimension of the panel product 102, the physical dimension being a length, a width, or a thickness of panel product 102 or a physical portion of the panel product 102. In an embodiment, the information of one or more parameters 122 of the panel product 102 comprises a nominal physical dimension of the panel product 102 corresponding to a predetermined nominal total surface area that can be covered with the panel product 102. Additionally, the information of one or more parameters 122 of the panel product 102 preferably comprises an actual physical dimension of the panel product 102 corresponding to a predetermined actual total surface area that can be covered with the panel product 102.

In an embodiment of the system 100 described in FIG. 10, the computer-readable code 112 comprises at least one security feature. Said security feature may serve as a warranty that the computer-traceable data 108 linked or linkable to the computer-readable code 112 is authentic. In an embodiment, the system 100 comprises first and second processor 104 and first and second computer storage media 106 located at first and second locations that are different from one another. The first and second locations may be the locations of a supply chain party, including but not limited to the manufacturer 44, the shipping company 45, the distributor 46, the retailer 47, or the end-consumer 48 or installer described with respect to FIG. 9. A first supply chain party transfers the panel product 102 to a second supply chain party, and the digital data 110 comprises the storing location and identity information of the first and second locations for supervising a logistic chain of the panel product 102.

The disclosed system 100 also provides for a method for tracking at least one panel product 102 for making a floor or wall panel covering. The method includes the step of manufacturing at least one panel product 102 comprising at least one computer-readable code 112 carried by at least one surface of the panel product 102. In an embodiment, the surface of the panel product 102 comprising the computer-readable code 112 is concealed after installation of the at least one panel for making the floor covering. The method includes the step of storing computer-traceable data 108 managed by the processor 104 on at least one computer storage media 106, the computer-traceable data 108 comprising digital data 110 regarding the at least one panel product 102 and the computer-readable code 112 providing a link to the digital data 110 stored on the computer storage media 106. The method further includes the steps of reading the computer-readable code 112 using the scanner device 114 and accessing information of one or more parameters 122 of the at least one panel product 102 to verify authenticity of the at least one panel product 102.

In an embodiment, the method further comprises subsequent to manufacturing the at least one panel product 102, transferring the at least one panel product 102 from a first location to a different second location, wherein a first supply chain party at the first location transfers the at least one panel product 102 to a second supply chain party at the second location. The digital data 110 comprises the storing location and identity information of the first and second locations for supervising a logistic chain of the panel product 102. The computer-readable code 112 further provides a link to digital data 110 to perform sanity checking of storing location and identity information of the first and second supply chain parties for identifying forgery of the at least one code or the panel product 102. The step of accessing information of one or more parameters 122 of the panel product 102 by a supply chain party can be partially locked by the computer storage media 106 to improve security in the supply chain.

In an embodiment with respect to FIG. 10, the computer-readable code 112 carried by the surface of the panel product 102 is applied on at least one label that is attached to the surface in an irreversible manner. Preferably the computer-readable code 112 is attached or applied to said to the panel product 102 in an irreversible manner or a tamper-resistant manner, i.e. it may not be removed without damage to the panel product 102. The attachment or application may be achieved by using adhesive means that are made of or comprise rubber, acrylic or an acrylic blend or through the use of machine etching, laser etching, thermal transfer, holograms, and the like. In an embodiment, the computer-readable code 112 is generated by one or more label emitting parties, with the digital data 110 being stored on at least one computer storage media 106 managed by the one or more label emitting parties.

According to a particular independent aspect, the present invention also is a panel 1 comprising a single- or multilayer board material as a substrate 17, and a decorative top layer 18 comprising a printed pattern 19 and, preferably a wear layer 20 applied on top of said printed pattern 19, wherein said panel comprises at least a first code concealed within said printed pattern 19 and/or concealed within a surface texture applied in or on said decorative top layer 18. Said panel preferably further comprises a second code applied to a surface of said panel, wherein said surface is concealed after installation. Said surface may be formed by a surface facing away from said decorative top layer 18. Said second code is preferably a visible code, e.g. in the form of a print, a barcode or QR code. Preferably at least said first code, and potentially said second code, are directly or indirectly linked to data 31 regarding one or more, e.g. physical and/or manufacturing, parameters of said product or of the batch said product is taken from. Preferably the data linked to the first code is identical as the data linked to the second code, and is preferably stored on the same digital data carrier 33. Preferably, the data linked to said first code at least contains data regarding said second code, and preferably vice-versa. The use of a first and a second code may allow straightforward authentication before installation, or after deinstallation, while not being disturbing in use.

The invention further relates to several embodiments as identified by the below numbered paragraphs.

1. —Product comprising a code 23 directly or indirectly linked to data 31 regarding one or more physical parameters and/or the manufacturing of said product or of the batch said product is taken from.

2. —Product according to paragraph 1, characterized in that said data 31 allows a, preferably unique or near-unique, identification of said product or of the batch said product is taken from.

3. —Product according to paragraph 1 or 2, characterized in that said data 31 comprises measurement data of at least one physical parameter, wherein said measurement data is more accurate than the level of accuracy at which said physical parameter can be obtained.

4. —Product according to any of the preceding paragraphs, characterized in that said one or more physical parameters comprise a physical dimension of said product, such as length L, width and/or thickness of said product.

5. —Product according to any of the preceding paragraphs, characterized in that said one or more physical parameters comprise a photographic image of said product.

6. —Product according to any of the preceding paragraphs, characterized in that said data regarding the manufacturing comprises an indication regarding its chronological order within said batch said product has been taken from.

7. —Product according to any of the preceding paragraphs, characterized in that said data regarding the manufacturing comprises an indication about the composition of said product and/or recommendations regarding its use and/or its discardment and/or its potential for recycling.

8. —Product according to any of the preceding paragraphs, characterized in that said code 23 is a scannable code, such as a barcode or a QR code.

9. —Product according to any of the preceding paragraphs, characterized in that said code is 23 visually perceivable.

10. —Product according to any of the preceding paragraphs, characterized in that said code 23 is formed by a print.

11. —Product according to any of the preceding paragraphs, characterized in that said code 23 is variably, directly or indirectly, linked to a subset 32 of said data 33, depending on the application used to receive said link and/or on the user desiring to receive said link.

12. —Product according to any of the preceding paragraphs, characterized in that said product is a floor or wall covering panel 1, preferably of the type comprising mechanical coupling parts 6 at at least one pair of opposite edges 2-3, wherein said mechanical coupling parts 6 in a coupled condition of two such panels 1 bring about a locking between the respective edges 2-3 in a vertical direction V perpendicular to the plane of coupled panels 1 and/or in a horizontal direction H in said plane and perpendicular to the coupled edges 2-3.

13. —Product according to paragraph 12, characterized in that said coupling parts 6 are basically formed as a tongue 8 and a groove 9 bordered by an upper groove lip 10 and a lower groove lip 11, wherein said upper groove lip 10 and lower groove lip 11 are preferably of unequal length, such that, for example, said lower groove lip 11 extends beyond said upper groove lip 10 over a distance D being at least half the thickness T of said floor or wall covering panel 1.

14. —Product according to paragraph 13, characterized in that said code 23 is provided on said tongue 8 and/or on said upper groove lip 10 or lower groove lip 11.

15. —Product according to any of the preceding paragraphs, characterized in that said product comprises a plurality of codes 23 directly or indirectly linking or linkable to said data 31.

16. —Panel comprising at least a single- or multilayer board material as a substrate 17, wherein said panel 1 is provided with a code 23 at one or more of the edges 2-3;4-5 of said board material.

17. —Panel according to paragraph 16, characterized in that said panel is of the type comprising mechanical coupling parts 6 at at least one pair of opposite edges 2-3, wherein said mechanical coupling parts 6 in a coupled condition of two such panels 1 bring about a locking between the respective edges 2-3 in a vertical direction V perpendicular to the plane of coupled panels 1 and/or in a horizontal direction H in said plane and perpendicular to the coupled edges 2-3.

18. —Panel according to paragraph 17, characterized in that said coupling parts 6 are basically formed as a tongue 8 and a groove 9 bordered by an upper groove lip 10 and a lower groove lip 11, wherein said upper groove lip 10 and lower groove lip 11 are preferably of unequal length, such that, for example, said lower groove lip 11 extends beyond said upper groove lip 10 over a distance D being at least half the thickness T of said floor or wall covering panel 1.

19. —Panel according to paragraph 18, characterized in that said code 23 is provided on said tongue 8 and/or on said upper groove lip 10 or lower groove lip 11.

20. —Panel according to paragraph 19, characterized in that said lower groove lip 11 extends beyond said upper groove lip 10, wherein the upper surface 15 of the portion of the lower groove lip 11 that extends beyond said upper lip 10 has been provided with said code 23 and/or the bottom surface 16 of the tongue 8 has been provided with said code 23.

21. —Panel according to any of paragraphs 16 to 20, characterized in that said panel (1) is a product according to any of paragraphs 1 to 15.

22. — Method for manufacturing a product, wherein the method comprises
the step S1 of providing a product in finished or semi-finished form;
the step S3 of applying a code 23 to said product; said code 23 being preferably unique or near unique to said product or to a batch of said products, and providing a direct or indirect link, or being linkable, to digital data 31, e.g. stored on a digital data carrier 33;
the step S2 of recording measurement data regarding one or more physical parameters of said product or batch and/or manufacturing data regarding said product or batch;
the step of storing said measurement data and/or manufacturing data, e.g. on said digital data carrier 33, such that the respective data 31 is directly or indirectly accessible by means of the link provided by said code 23.

23. — Method for manufacturing a product, whether or not in accordance with paragraph 22, wherein the method comprises
the step S1 of providing a product in finished or semi-finished form;
the step S3 of applying a code 23 to said product; said code being preferably unique or near unique to said product or to a batch of said products, and providing a direct or indirect link, or being linkable, to digital data 31, e.g. stored on a digital data carrier 33;
the step of providing said product with a portion 35 that varies, may vary, or is made to vary from product to product, or from batch to batch, and storing data 31 regarding the specific portion, i.e. the particular variation or said portion provided on said product, e.g. on said digital data carrier 33, such that the respective data 31 is directly or indirectly accessible by means of the link provided by said code 23.

24. —Method according to paragraph 22 or 23, characterized in that said data 31 allows a, preferably unique, or near unique, identification of said product or of the batch said product is taken from.

25. —Method according to any of paragraphs 22 to 25, characterized in that it is used to manufacture a product or panel 1 having the characteristics of any of paragraphs 1 to 21.

26. —Method for authenticating a product, preferably a decorative panel 1, wherein the product comprises a code 23 directly or indirectly linked to data 31 regarding one or more physical parameters and/or the manufacturing of said product or of the batch said product is taken from, wherein said method comprises:
the step of accessing said data 31 by means of said code 23;
the step of checking said data 31 against said product.

27. —Method according to paragraph 26, wherein said product is a product according to any of paragraphs 1 to 15 and/or a panel 1 according to any of paragraphs 16 to 21, and/or a product obtained through a method in accordance with any of paragraphs 22 to 25.

28. —Packaged set of floor and/or panel products, characterized in that said packaged set 38 comprises a label 40 having both at least one security feature 41 and at least a code 23A directly or indirectly linked to data 31 regarding said label 40 and/or said products.

29. —Packaged set according to paragraph 28, characterized in that said security feature 41 is a hologram.

30. —Packaged set according to paragraph 28 or 29, characterized in that said code 23A is a scannable code, such as a barcode or a QR code.

31. —Packaged set according to any of paragraphs 28 to 30, characterized in that said security feature 41 and said code 23A are positioned adjacently on the label 40, preferably without overlaps.

32. —Packaged set according to any of paragraphs 28 to 31, characterized in that said security feature 41 and said code 23A are diagonally positioned on said label 40.

33. —Packaged set according to any of paragraphs 28 to 32, characterized in that said label 40 is adhesively connected to said packaged set 38.

34. —Packaged set according to any of paragraphs 28 to 33, characterized in that said packaged set 38 comprises a box containing said products, and a foil wrapped around said box, wherein said label 40 is covered by said foil, and preferably attached to said box.

35. —Packaged set according to any of paragraphs 28 to 34, characterized in that said label 40 displays a, preferably unique or nearly unique, number 43.

36. —Packaged set according to paragraph 35, characterized in that said data 31 at least comprises said number 43.

37. —Packaged set according to any of paragraphs 28 to 36, characterized in that said data 31 allows a, preferably unique, or near unique, identification of said label 40, said product, or the batch said product is taken from.

38. —Packaged set according to any of paragraphs 28 to 37, characterized in that said data 31 comprises data regarding one or more physical parameters and/or the manufacturing of said product or of the batch said product is taken from.

39. —Packaged set according to paragraph 38, characterized in that said one or more physical parameters comprise a physical dimension of said product, such as nominal or actual length L, width and/or thickness of said product.

40. —Packaged set according to any of paragraphs 28 to 39, characterized in that said data 31 comprises data regarding the manufacturer 44, date of manufacturing, the shipper 45, date of shipment, the distributor 46, date of distribution, the sale to an end consumer 48, date of such sale, and/or the place and date of installation.

41. —Packaged set according to any of paragraphs 28 to 40, characterized in that said data 31 comprises data regarding the warranty, installation instructions, and/or advice on maintenance of the product.

42. —Packaged set according to any of paragraphs 28 to 41, characterized in that said data 31 comprises an indication about the composition of said product and/or recommendation regarding its use and/or discardment and/or its potential for recycling and/or its ecological impact.

43. —Packaged set according to any of paragraphs 28 to 42, characterized in that said code 23A is variably, directly or indirectly, linked to a subset 32 of said data 31, for example depending on the application used to receive information from said link and/or on the user desiring to receive information from said link.

44. —Method for tracking a set of floor and/or panel products, characterized in that said method comprises at least the following steps:

the step S1 of manufacturing said set 38 of floor and/or panel products by a manufacturer 44;

the step S2-S3-S4 of shipping, selling and/or distributing said set by respectively a shipping company 45, a retailer 47 and/or a distributor 46, wherein the shipping, selling and/or distributing of said set is made together with a label 40 having at least a code 23A providing a direct or indirect link, or being linkable, to digital data, e.g. stored on a digital data carrier 33, wherein said label 40 preferably also has at least one security feature 41; and the step S5A-S5B-S5C-S5D of storing data regarding said set or said products and making it accessible by means of said link.

45. —Method according to paragraph 44, characterized in that said method is applied for tracking a packaged set 38 of floor panels as in any of paragraphs 28 to 43.

46. —Method according to paragraph 44 or 45, characterized in that said step of storing data S5A-S5B-S5C, comprises the manufacturer 44, the shipping company 45, the retailer 47 and/or the distributor 46 storing at least a part of said data 31.

47. —Method according to any of paragraphs 44 or 46, characterized in that said method further comprises the step S6 of accessing said data 31 or a subset 32 thereof by means of the link provided by said code 23A, wherein said step S6 of accessing is preferably executed at least by one or more of the end consumer 48, the retailer 47, the distributor 46, the shipping company 45 and/or the manufacturer 44.

48. —Method according to paragraph 47, characterized in that said method further comprises the step S7 of storing location and/or identity information regarding one or more of the parties executing said step S6 of accessing and/or said step S5A-S5B-S5C of storing data.

49. —Method according to paragraph 47 or 48, characterized in that the method further comprises the step of sanity checking said location and/or identity information, and, preferably, identifying forgery of said label 40 and/or product.

50. —Method according to any of paragraphs 47 to 49, characterized in that said method further comprises the step of at least partially locking said access.

51. —Method according to any of paragraphs 44 to 50, characterized in that said method further comprises the step of activating said label 40 by any of the manufacturer 44, the shipping company 45, the distributor 46 and/or the retailer 47.

52. —Method according to any of paragraphs 44 to 51, characterized in that said label 40 is provided by one or more label emitting parties, wherein said digital data 31 is preferably stored on a digital data carrier 33 managed by one or more of said label emitting parties.

53. —Method according to any of paragraphs 44 to 52, characterized in that said method is in common between a plurality of manufacturers 44, shipping companies 45, distributors 46 and/or retailers 47.

54. —Method according to paragraph 52 and 53, characterized in that the number of label emitting parties is smaller than the number of manufacturers having said method in common.

55. —Method according to paragraph 54, characterized in that the label emitting party depends on a feature of said floor or panel products, for example on the type of mechanical coupling parts 6 used on said floor or panel product, when available.

56. —A system 100 for tracking at least one panel product 102 for making a floor covering, the system comprising:

at least one processor 104;

at least one computer storage media 106 storing computer-traceable data 108 managed by the at least one processor 104, the computer-traceable data 108 comprising digital data 110 regarding the at least one panel product 102;

at least one computer-readable code 112 arranged for placement on the at least one panel product 102, the at least one computer-readable code 112 providing a link to the digital data 110 stored on the at least one computer storage media 106; and at least one scanner device 114 configured to read the at least one computer-readable code 112 and transfer code-specific information 116 of the at least one computer-readable code 112 to the at least one processor 104, the computer-traceable data 108 comprising the code-specific information 116 of the at least one computer-readable code 112;

wherein the at least one computer-readable code 112 is carried by a surface 118 of the at least one panel product;

wherein the at least one processor 104, the at least one computer storage media 106, and the at least one scanner device 114 are communicatively coupled by a network 120 for enabling the transfer of the computer-traceable data 108;

wherein the link to the digital data provides access to information of one or more parameters 122 of the at least one panel product 102, for example to verify authenticity of the at least one panel product 102.

57. —The system of paragraph 56, wherein the information of one or more parameters of the at least one panel product comprises one or more physical parameters, manufacturing parameters, or both physical and manufacturing parameters of the at least one panel product.

58. —The system of paragraph 56 or 57, wherein at least one computer-readable code of the at least one panel product is concealed after installation of the at least one panel product for making the floor covering.

59. —The system of paragraph 57, wherein the information of one or more physical parameters of the at least one panel product comprises a measurement defining a mutual distance between a first code and a second code.

60. —The system of paragraph 59, wherein the mutual distance is made to vary between panel products.

61. —The system of any of paragraphs 57 to 60, wherein the information of one or more physical parameters comprises a photographic image corresponding to the at least one panel product.

62. —The system of any of paragraphs 57 to 61, wherein the information of one or more physical parameters of the at least one panel product comprises a physical dimension of the at least one panel product, the physical dimension being a length, a width, or a thickness of panel product or a physical portion of the at least one panel product.

63. —The system of any of paragraphs 57 to 62, wherein the information of one or more physical parameters of the at least one panel product comprises a nominal physical dimension of the at least one panel product corresponding to a predetermined nominal total surface area that can be covered with the at least one panel product.

64. —The system of any of paragraphs 57 to 63, wherein the information of one or more physical parameters of the at least one panel product comprises an actual physical dimension of the at least one panel product corresponding to a predetermined actual total surface area that can be covered with the at least one panel product.

65. —The system of any of the preceding paragraphs, wherein the computer-readable code comprises at least one security feature.

66. —The system of any of the preceding paragraphs, wherein the system comprises first and second processors and first and second computer storage media located at first and second locations different from one another.

67. — A method, implemented at a computer system that includes at least one processor, for tracking at least one panel product for making a floor covering, the method comprising:

manufacturing at least one panel product comprising at least one computer-readable code carried by a surface of the at least one panel product, the surface and/or the computer-readable code being concealed at least after installation of the at least one panel for making the floor covering;

storing computer-traceable data managed by the at least one processor on at least one computer storage media, the computer-traceable data comprising digital data regarding the at least one panel product and the at least one computer-readable code providing a link to the digital data stored on the at least one computer storage media;

reading at least one code of the at least one computer-readable code using at least one scanner device; and accessing information of one or more physical parameters of the at least one panel product to verify authenticity of the at least one panel product.

68. —The method includes, subsequent to manufacturing the at least one panel product, transferring the at least one panel product from a first location to a different second location, wherein the first location comprises a first processor, a first computer storage media, and a first scanner device;

wherein the second location comprises a second processor, a second computer storage media, and a second scanner device.

69. —The method includes a first supply chain party at the first location transfers the at least one panel product to a second supply chain party at the second location.

70. —The method involves the digital data including storing location and identity information of the first and second locations for supervising a logistic chain of the at least one panel product.

71. —The method involves the at least one code providing the link to digital data to perform sanity checking of storing location and identity information of the first and second supply chain parties for identifying forgery of the at least one code or the at least one panel product.

72. —The method involves accessing information of one or more physical parameters of the at least one panel product by a supply chain party is at least partially locked by the at least one computer storage media.

73. —The method involves the at least one computer-readable code being carried by the surface of the at least one panel product is applied on at least one label that is attached to the surface in an irreversible manner.

74. —The method involves the at least one computer-readable code being generated by one or more label emitting parties, the digital data being stored on at least one computer storage media managed by the one or more label emitting parties.

75. —A system for tracking at least one panel product for making a floor covering, the system comprising:

at least one processor;

at least one computer storage media storing computer-traceable data managed by the at least one processor, the computer-traceable data comprising digital data regarding the at least one panel product;

a plurality of computer-readable codes arranged for placement on the at least one panel product, the plurality of computer-readable codes being identical and/or providing a, preferably identical, link to the digital data stored on the at least one computer storage media; and at least one scanner device configured to read at least one code of the plurality of computer-readable codes and transfer code-specific information of the at least one code to the at least one processor;

wherein the at least one code is carried by a surface of the at least one panel product, the surface and/or said code being concealed at least after installation of the at least one panel product for making the floor covering;

wherein the at least one processor, the at least one computer storage media, and the at least one scanner device are communicatively coupled by a network for enabling the transfer of the computer-traceable data;

wherein, in response to the at least one code being read by the at least one scanner device, the processor compares the code-specific information to the digital data stored on the at least one computer storage media to verify authenticity of the at least one code;

wherein the link to the digital data provides access to information of one or more physical parameters of the at least one panel product to verify authenticity of the at least one panel product.

76. —Panel comprising a single- or multilayer board material as a substrate 17, and a decorative top layer 18 comprising a printed pattern 19 and, preferably a wear layer 20 applied on top of said printed pattern 19, characterized in that said panel 1 comprises at least a first code concealed within said printed pattern 19 and/or concealed within a surface texture applied in or on said decorative top layer 18, and in that said panel further comprises a second code applied to a surface of said panel 1, wherein said surface is concealed after installation.

The present invention is in no way limited to the embodiments described by way of example and represented in the figures; on the contrary may products, panels and methods be realized according to various variants without leaving the scope of the invention.

The invention claimed is:

1. A system for tracking at least one panel product for making a floor covering, the system comprising:

at least one processor;

at least one computer storage media storing computer-traceable data managed by the at least one processor, the computer-traceable data comprising digital data regarding the at least one panel product;

at least one computer-readable code displayed and disposed in a visual and physical medium on the at least one panel product, the at least one computer-readable code providing a link to the digital data stored on the at least one computer storage media; and at least one scanner device configured to read the at least one computer-readable code and transfer code-specific information of the at least one computer-readable code to the at least one processor, the computer-traceable data comprising the code-specific information of the at least one computer-readable code;

wherein, after installation, the at least one computer-readable code is carried by a surface of the at least one panel product;

wherein the at least one processor, the at least one computer storage media, and the at least one scanner device are communicatively coupled by a network to transfer the computer-traceable data;

wherein the link to the digital data provides access to information of one or more parameters of the at least one panel product to check against the at least one panel product;

wherein the information of one or more parameters of the at least one panel product comprises one or more physical parameters, manufacturing parameters, or both physical and manufacturing parameters of the at least one panel product.

2. The system of claim 1, wherein at least one computer-readable code of the at least one panel product is concealed after installation of the at least one panel product for making the floor covering.

3. The system of claim 1, wherein the information of one or more physical parameters of the at least one panel product comprises a measurement defining a mutual distance between a first code and a second code.

4. The system of claim 3, wherein the mutual distance is made to vary between panel products.

5. The system of claim 1, wherein the information of one or more physical parameters comprises a photographic image corresponding to the at least one panel product.

6. The system of claim 1, wherein the information of one or more physical parameters of the at least one panel product comprises a physical dimension of the at least one panel product, the physical dimension being a length, a width, or a thickness of panel product or a physical portion of the at least one panel product.

7. The system of claim 1, wherein the information of one or more physical parameters of the at least one panel product comprises a nominal physical dimension of the at least one panel product corresponding to a predetermined nominal total surface area that can be covered with the at least one panel product.

8. The system of claim 1, wherein the information of one or more physical parameters of the at least one panel product comprises an actual physical dimension of the at least one panel product corresponding to a predetermined actual total surface area that can be covered with the at least one panel product.

9. The system of claim 1, wherein the computer-readable code comprises at least one security feature.

10. The system of claim 1, wherein the system comprises first and second processors and first and second computer storage media located at first and second locations different from one another.

11. A system for tracking at least one panel product for making a floor covering, the system comprising:

at least one processor;

at least one computer storage media storing computer-traceable data managed by the at least one processor, the computer-traceable data comprising digital data regarding the at least one panel product;

a plurality of computer-readable codes displayed and disposed in a visual and physical medium on the at least one panel product, the plurality of computer-readable codes being identical and/or providing a, preferably identical, link to the digital data stored on the at least one computer storage media; and at least one scanner device configured to read at least one code of the plurality of computer-readable codes and transfer code-specific information of the at least one code to the at least one processor;

wherein the at least one code is carried by a surface of the at least one panel product, the surface and/or said code being concealed at least after installation of the at least one panel product for making the floor covering;

wherein the at least one processor, the at least one computer storage media, and the at least one scanner device are communicatively coupled by a network to transfer the computer-traceable data;

wherein, in response to the at least one code being read by the at least one scanner device, the processor compares the code-specific information to the digital data stored on the at least one computer storage media to verify authenticity of the at least one code;

wherein the link to the digital data provides access to information of one or more physical parameters of the at least one panel product to verify authenticity of the at least one panel product.

12. The system of claim 1, wherein the physical medium is provided by at least one of: machine etching, laser etching, printer device, thermal transfer, hologram, magnetic strip, chip with microprocessor enabling near-field communication, and RFID tag.

13. The system of claim 1, wherein the information of one or more physical parameters of the at least one panel product is provided to verify authenticity of the at least one panel product.

14. The system of claim 1, wherein the computer-readable code is concealed on a surface that is in itself visible in use.

15. The system of claim 14, wherein the surface that is in itself visible in use comprises a decorative pattern, wherein the computer-readable code forms part of the decorative pattern.

16. The system of claim 15, wherein the computer-readable code is concealed within the decorative pattern.

17. The system of claim 16, wherein the at least one panel product comprises a substrate, a printed carrier sheet and a wear layer on top of said printed carrier sheet.

18. The system of claim 17, wherein the at least one panel product comprises a relief or structure available at the surface that is in itself visible in use.

19. The system of claim 18, wherein the at least one panel product comprises coupling parts at at least one pair of opposite edges, wherein said coupling parts in a coupled condition of two such panels bring about a locking between the respective edges in a vertical direction perpendicular to a plane of coupled panels and/or in a horizontal direction in said plane and perpendicular to the coupled edges;

wherein the coupling parts are formed in one piece with material of the at least one panel product; and wherein the coupling parts are formed as a tongue and a groove.

20. The system of claim 19, wherein the at least one panel product is a floor or panel product containing PVC and an amount of additives, wherein the floor or panel product comprises a substrate of a filled synthetic composite.

21. The system of claim 19, wherein the computer-readable code is applied by means of an inkjet printer.

22. The system of claim 21, wherein the computer-readable code is configured to be scanned by means of a smartphone.

* * * * *